United States Patent [19]
Haulotte

[11] 3,733,053
[45] May 15, 1973

[54] PULLEY BLOCKS FOR HOISTING

[76] Inventor: Georges Haulotte, Rue de la Chambolle, 73 Barberaz, France

[22] Filed: May 13, 1971

[21] Appl. No.: 142,925

[30] Foreign Application Priority Data

May 14, 1970 France..................................7017582

[52] U.S. Cl.....................................254/192, 74/240
[51] Int. Cl................................................B66d 1/36
[58] Field of Search..................254/190 R, 192, 193, 254/194; 74/240, 224; 294;67 R;81 R/

[56] References Cited

UNITED STATES PATENTS

| | | | |
|---|---|---|---|
| 525,605 | 9/1894 | Koch | 254/190 |
| 1,634,939 | 7/1927 | Gallman et al. | 254/190 |
| 1,857,434 | 5/1932 | Cole | 254/190 |
| 2,838,336 | 6/1958 | Archer | 254/190 |

FOREIGN PATENTS OR APPLICATIONS

| | | | |
|---|---|---|---|
| 216,330 | 10/1967 | Sweden | 254/190 |
| 180,321 | 9/1966 | U.S.S.R. | 294/81 R |

*Primary Examiner*—Richard E. Aegerter
*Assistant Examiner*—Merle F. Maffei
*Attorney*—Toren & McGeady

[57] ABSTRACT

Pulley block comprising at least one rim having a groove for receiving a flexible tie, such as rope, cable or chain, mounted for rotation on an annular part, characterized in that the said annular part is designed and adapted to receive and support a suspension member for a load to be handled.

7 Claims, 3 Drawing Figures

PULLEY BLOCKS FOR HOISTING

The invention concerns pulley blocks, such as are used in widely differing hoisting apparatus and installations, comprising at least one grooved pulley for receiving a flexible tie, such as a rope, cable or chain.

It relates more particularly to pulley blocks of the type comprising at least one grooved rim for receiving the flexible tie and mounted for rotation on an annular part.

In known pulley blocks of this kind, the annular part forms a distance piece clamped between two side plates, extending considerably beyond the rotating rim and which are provided with elements, such as eyes, for the attachment of the pulley block to force-transmitting cables or chains. These side plates, however, are bulky in the direction of the height of the pulley block as well as in the direction of its thickness. Furthermore, they give rise to relatively long slings and this length may be inconvenient in some cases.

It is the aim of the invention to provide a hoisting pulley block of the aforesaid type which does not have the disadvantages of known pulley blocks.

For this purpose, according to the invention, the annular part is designed and adapted to receive and support the suspension members for the loads to be hoisted.

Owing to this particular structure, all the forces are transmitted directly to the pulley block by the annular part, such that the side plates, if they exist, no longer require to be so robust and bulky as in the known pulley blocks, since they now only serve as members protecting the elements for mounting the rotating rim on the annular part, preferably by means of smooth rings or also a ring of rolling elements such as balls or rollers.

In certain embodiments, the suspension members comprise a sling passed directly through the said annular part, the bore of which at least over a certain angular extent has a convex, rounded section adapted to receive the sling, such that direct slings of very short length can thus be formed.

In other embodiments, the suspension members comprise a swingle-bar passed through the annular part and resting in the latter by its central part, load-suspension cables being attached to its two ends. With this solution also, appreciable space is gained in the vertical direction.

Possibly, the annular part is secured to two side plates, part of which at least is situated on a larger radius than that of the grooved rim and supports a load-suspension hook.

The invention will be better understood from a perusal of the following description and an examination of the accompanying drawings, which show as non-restrictive examples some embodiments of an improved pulley block according to the invention. In these drawings.

Figure 1:
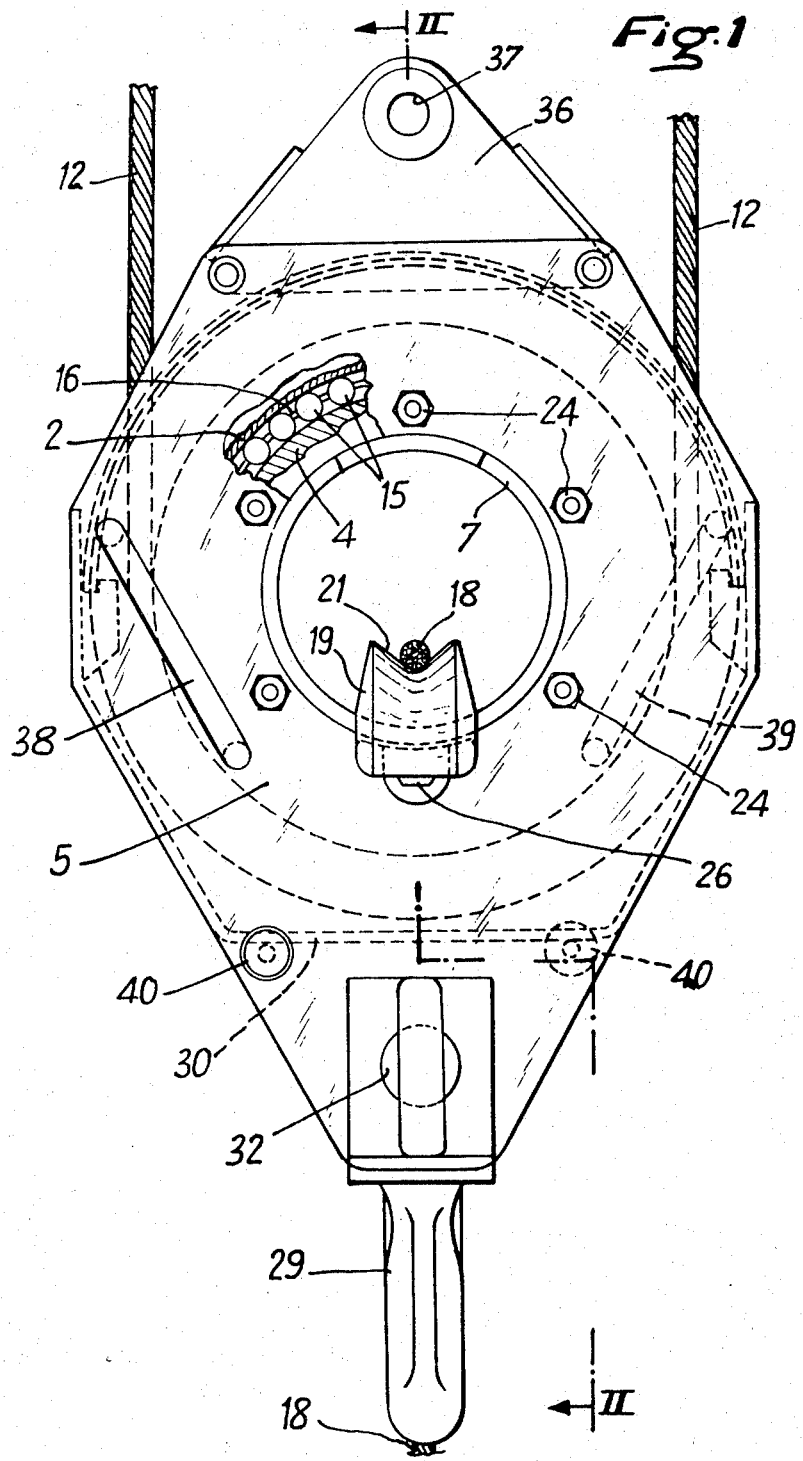
FIG. 1 is a front view, with parts broken away, of a pulley block according to the invention having one sheave.
Figure 2:
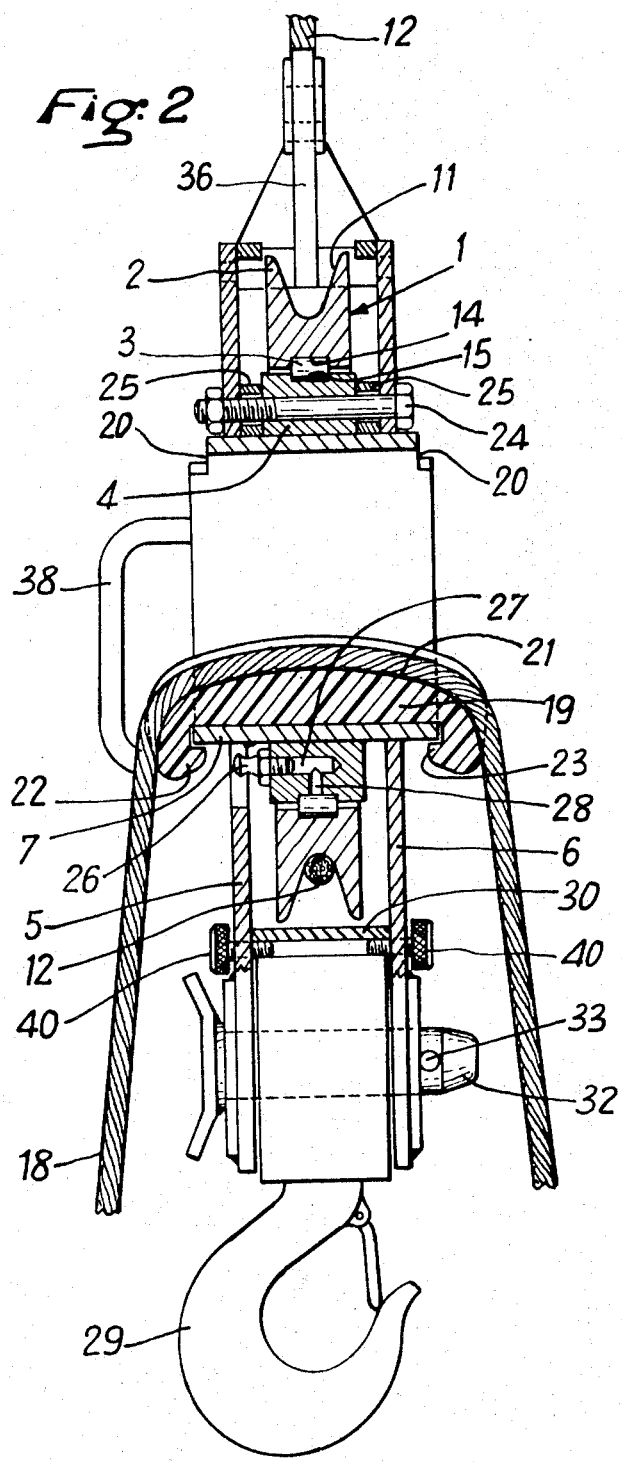
FIG. 2 is a section on the line II—II of FIG. 1.

The pulley block according to the invention shown in FIG. 1 and 2 comprises a single pulley or sheave denoted as a whole by 1 and comprising a grooved rim 2 mounted for rotation on a ring of rolling elements 3, such as cylindrical rollers, for example, on an annular part 4 fixed between two side plates 5, 6. In the example shown, a cylindrical tube 7 is fitted and fixed, for example by welding, in one of the two side plates.

The rim 2 has a groove 11 of any appropriate form for receiving the flexible hoisting tie, such as the cable 12 or even a chain for example.

The rolling elements 3 are fitted in two corresponding grooves 14, 15 of the rim 2 and of the annular part 4, respectively; they are separated from one another by the elements of a cage 16 to make their mounting possible.

The ring of rolling elements 3 may be formed in any other known manner, for example cylindrical rollers inclined at 45° alternately in one direction and the other and accommodated in two grooves of corresponding V section, facing one another in the rim 2 and in the annular part 4, respectively. The rollers could also be replaced by other elements, such as needles or also balls. An assemblage having smooth rings instead of rolling elements cold also be adopted.

The advantages of this arrangement over that of conventional pulley blocks will not be re-enumerated, since they have already been pointed out in the foregoing.

In the example shown in FIG. 1, short slinging has been achieved by the fact that a sling 18 is passed directly through the tube 7 against the inner surface of which it is supported, preferably by means of a profiled lining sole 19, for example of plastics material, as shown, or even of wood, which has a groove 21 of a generally rounded configuration in order not to cause local fatigue of the loop against sharp edges. In the embodiment shown, the lining sole 19 has two retaining noses 22, 23. It may be removed by sliding it on the tube 7 into the diametrically opposite zone of the tube provided with two recesses 20, into which the two noses 22, 23 of the lining sole can be introduced. The lining sole may therefore by replaced by another of appropriate configuration, or two soles may be arranged optionally if desired.

The element supporting the loop 18 is not necessarily formed by an attached part such as the sole 19; it may be formed, for example, directly by boring the annular part, formed here by the tube 7, suitably profiled substantially according to the convex shape of the bottom of the groove 21 of the sole 19; in such a case, the groove 21 would no longer be necessary.

The side plates 5 and 6 are fitted to the annular part 4 by bolts 24, for example, and spacing washers 25. A bent casing 30, welded to the side plates, surrounds the lower half of the rim 2.

The rolling elements 3 may be lubricated by means of a lubricator 26 communicating with the race of the said elements by suitable internal ducts 27, 28.

In the example shown, the lower part of the two side plates 5, 6 is of larger radius than that of the grooved rim 2 and supports a detachable load-suspension hook 29. This hook is of the detachable hinge pin type, the pin 32 passing through the two side plates and being retained by a safety pin 33. It is therefore possible at any moment to remove this hook for modifying, according to the working conditions, the number of pulley strands. For this purpose, the inner casing 30 for guiding the cables is also detachable. This arrangement is useful in the case of a pulley block having a number of sheaves.

In the present construction, the said casing is held in place by two knurled-head screws 40, which are slackened to cause the casing to drop after removal of the hook. This is necessary for removing or replacing the cable when the latter terminates in a bulb or sleeved eye. Of course, the two screws 40 may be replaced by other fixing means, such as pins, pawls, etc. This hook could evidently be replaced by another of a different type, for example of the swivel type. Such a load-suspension hook could also not exist, in which case the two side plates could then be smaller.

Still in the example shown, the upper part of the side plates is provided with a lug 36 having an eye 37 for the attachment of the dead strand of the cable 12. Of course, this lug could also be omitted in applications where it is not necessary.

Finally, two handles 38, 39 are shown, fixed respectively to the two side plates 5, 6 for convenient manipulation.

Figure 3:
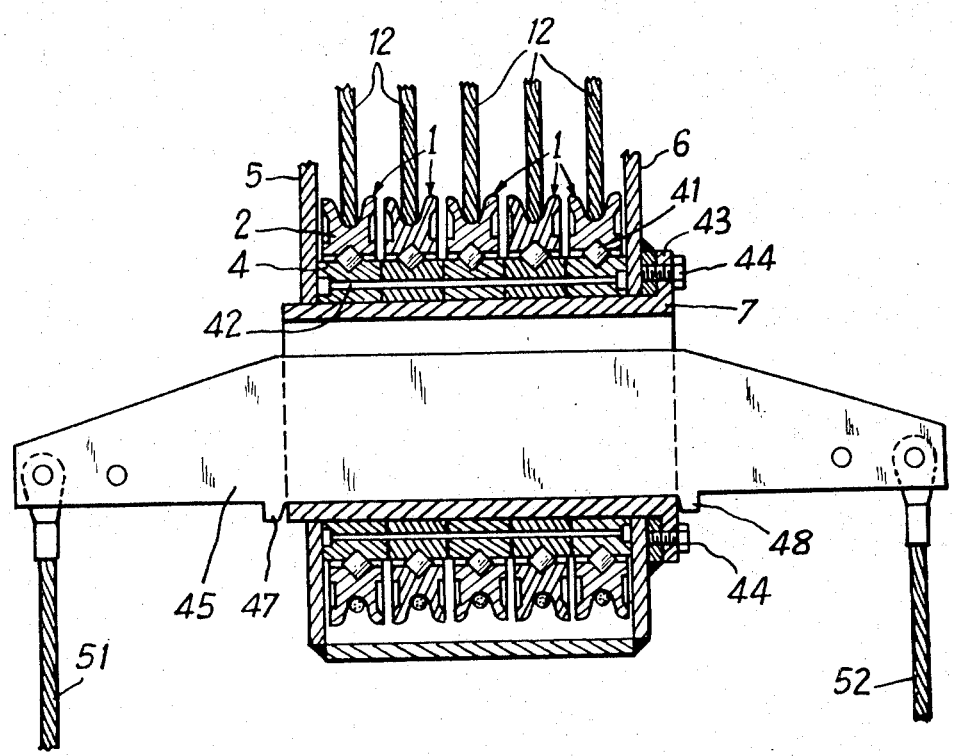
FIG. 3 represents, in vertical section, another embodiment of a pulley block according to the invention having a plurality of sheaves.

In another embodiment shown in FIG. 3, the block comprises several pulleys, namely five in the example. Each of these pulleys is of the same design as pulley 1 of the embodiment of FIGS. 1 and 2. As a modification, there are shown rings of rolling elements 41 comprising cylindrical rollers inclined at 45° alternately in one direction and the other.

The annular parts 4 of each of the pulleys are clamped together by axially directed tie rods such as 42, distributed over the circumference of the said parts. These tie rods may also pass through the two side plates 5 and 6 of the block.

The lateral flat faces of the annular parts may have fitted joints, consisting of male and female joggles, respectively for reinforcing the assemblage. In the example, all the annular parts such as 4 are threaded on an inner tube 7 having a collar 43 fixed to the side plate 6 by screws 44.

A beam 45, passed through the interior of the tube 7 and having two projections 47, 48, for preventing axial sliding in the interior of the said tube during hoisting operations, is shown by way of example. This beam may serve as swingle-bar, to the two ends of which are attached two cables 51, 52.

Of course, the invention is not limited to the embodiments described and shown and which have been given as examples; numerous modifications may be made, according to the applications contemplated, without departing from the scope of the invention for that purpose.

What is claimed is:

1. Pulley block comprising an annular part defining an axially extending bore with a pair of end faces on said annular part extending transversely on the axis of the bore and defining the ends of the bore, a rim rotatably mounted on said annular part in coaxially relationship with the bore of said annular part, said rim having a groove therein for receiving a flexible line such as a rope, cable, chain and the like, a sling-receiving member positioned and supported within the bore in said annular part and extending in the axial direction of the bore outwardly from both said end faces, said sling receiving member having a pair of abutment members spaced apart in the axial direction of the bore and each of said abutment members disposed in engagement with a different one of said end faces of said annular part for retaining said sling-receiving member in the bore of said annular part.

2. Pulley block as set forth in claim 1, wherein said sling receiving member comprises a profiled lining sole having a lower convex face shaped to mate with the surface of the bore in said annular part on which it is supported, and the surface of said lining sole opposite said lower convex face forming a sling-receiving groove extending in the axial direction of the bore and located in a radial plane relative to said annular part.

3. Pulley block, as set forth in claim 2, wherein a flexible sling is supported in said groove in said lining sole.

4. Pulley block, as set forth in claim 3, wherein said lining sole is formed of a plastics material.

5. Pulley block, as set forth in claim 2, wherein said abutment elements each comprises a hook-shaped retaining nose formed on and projecting downwardly from said lower convex face of said lining sole.

6. Pulley block, as set forth in claim 1, wherein said sling receiving member comprises a swingle bar having a central portion and an end portion on each of the opposite ends of said central portion, said central portion positioned within and supported on the surface of said bore, said end portions projecting outwardly from the end faces of said annular part and each arranged to receive the end of a sling.

7. Pulley block, as set forth in claim 6, wherein said end portions each having a said abutment element formed thereon at its end adjoining the adjacent end face of said annular part.

* * * * *